(12) United States Patent
Takahashi et al.

(10) Patent No.: US 6,341,701 B1
(45) Date of Patent: Jan. 29, 2002

(54) CERAMIC POROUS MEMBRANE INCLUDING CERAMIC OF CERAMIC AND CERAMIC SOL PARTICLES, CERAMIC POROUS BODY INCLUDING THE MEMBRANE, AND METHOD OF MANUFACTURING THE MEMBRANE

(75) Inventors: Tomonori Takahashi, Chita; Manabu Isomura, Tsushima, both of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 08/996,149

(22) Filed: Dec. 22, 1997

(30) Foreign Application Priority Data

Dec. 27, 1996 (JP) .............................. 8-357772

(51) Int. Cl.$^7$ .............................................. B01D 71/02
(52) U.S. Cl. ................ 210/490; 210/500.25; 210/510.1; 264/43; 264/621; 427/245; 427/376.2
(58) Field of Search ........................... 210/500.25, 490, 210/510.1; 96/4; 55/523; 264/42, 43, 621; 427/245, 376.2

(56) References Cited

U.S. PATENT DOCUMENTS

| | | | | |
|---|---|---|---|---|
| 4,865,630 A | * | 9/1989 | Abe | |
| 4,971,696 A | * | 11/1990 | Abe et al. | |
| 5,098,571 A | * | 3/1992 | Maebashi | ............... 210/500.23 |
| 5,268,101 A | * | 12/1993 | Anderson et al. | ......... 210/510.1 |
| 5,716,559 A | * | 2/1998 | Larsen et al. | .................. 264/28 |
| 5,863,679 A | * | 1/1999 | Tsushima et al. | |

FOREIGN PATENT DOCUMENTS

| | | |
|---|---|---|
| DE | 42 27 720 A1 | 4/1993 |
| EP | 0 348 041 A1 | 12/1989 |
| EP | 0 471 910 A1 | 2/1992 |
| EP | 0 536 995 A1 | 4/1993 |
| JP | 63-274407 | 11/1988 |

OTHER PUBLICATIONS

Database WPI Week 8950; Derwent Publications Ltd., London, GB; AN 89-367366 XP002056553 & JP 01 274 815 (TOTO LTD), Nov. 2, 1989 *abstract*.

"Preparation of Spinel Ultrafiltration Membranes"; K.B. Pflanz et al., Advanced Materials, vol. 4, No. 10, Oct. 1992, Weinheim, Germany; pp. 662–664 XP000321605 *the whole document*.

Patent Abstracts of Japan; vol. 13, No. 95 (C–573), Mar. 6, 1989 & JP 63 274407 A (Kubota LTD), Nov. 11, 1988, *abstract*.

* cited by examiner

Primary Examiner—Matthew O. Savage
(74) Attorney, Agent, or Firm—Parkhurst & Wendel, L.L.P.

(57) ABSTRACT

The ceramic porous membrane comprises ceramic particles and ceramic sol particles (with the exception of $TiO_2$ sol particles). The ceramic particles and the ceramic sol particles are kneaded to obtain a kneaded product or a slurry, and the kneaded product or the slurry are sintered at a lower temperature. The ceramic sol particles have an average particle diameter of ⅕ or less of an average particle diameter of the ceramic particles, and the ceramic sol has a solid content of 1 to 30% by weight based on the weight of solid content of the ceramic particles. The method of manufacturing a ceramic porous membrane includes adding ceramic particles) having an average particle diameter of ⅕ or less an average particle diameter of ceramic particles to the ceramic particles such that the solid content of the ceramic sol is 1 to 30% by weight based on the weight of a solid content of the ceramic particles, mixing the particles, depositing or molding the resulting mixture, and heat treating the resulting film or molded product at 300° C. or less under vapor atmosphere, or at 300 to 700° C. under ambient atmosphere, thereby fixing the ceramic particles.

13 Claims, 3 Drawing Sheets

CERAMIC POROUS MEMBRANE INCLUDING CERAMIC OF CERAMIC AND CERAMIC SOL PARTICLES, CERAMIC POROUS BODY INCLUDING THE MEMBRANE, AND METHOD OF MANUFACTURING THE MEMBRANE

BACKGROUND OF THE INVENTION AND RELATED ART STATEMENT

The present invention relates to a ceramic porous membrane, a ceramic porous body and a method of manufacturing the membrane. More particularly, it relates to a ceramic porous membrane comprising ceramic particles and ceramic sol particles as a binder for the ceramic particles, and a method of manufacturing the ceramic porous membrane.

Ceramic porous membrane is used in, for example, filters for solid-liquid separation. As compared with polymeric membranes which are used for the same purpose a ceramic porous membrane is useful in that since physical strength and durability are excellent, reliability is high, and that since corrosion resistance is high, deterioration is small even if washed with acid or alkali, and that it is possible to finely control pore diameter which determines filtration ability.

Conventionally, filtration ability has been secured by further forming a porous membrane having small pore diameter on, for example, a surface of a substrate comprising a porous material having relatively large pore diameter.

For example, Japanese Patent Application Laid-Open No. 63-274407 discloses a method of manufacturing a porous membrane, which comprises adding ceramic sol to particles which constitute a ceramic membrane, and sintering the resulting mixture at 1,200° C.

In each of the above-described methods, ceramic particles are sintered to each other, or ceramic particles and ceramic sol particles are sintered, at a high temperature to form neck between particles, thereby obtaining further strong bond.

Therefore, unless the particles are sintered at a high temperature of at least 1,200° C., ceramic porous membrane having practically usable strength cannot be formed. Further, sintering at such a high temperature involves disadvantages that electric charges are high, and a setter to be used for the sintering must be constituted of a refractory material which can be used at a high temperature, such as silicon carbide. Thus, expensive and specific facilities must be provided, and equipment investment is necessary, resulting in a high cost.

SUMMARY OF THE INVENTION

In view of the above problems inherent in the prior art, the present invention has been made, and therefore an object of the invention is to provide a ceramic porous membrane and a ceramic porous body which can be molded at a temperature at which any specific refractory facilities are not required, and which has practically usable strength.

Another object of the present invention is to provide a method of manufacturing the ceramic porous membrane.

According to one aspect of the present invention, there is provided a ceramic porous membrane comprising ceramic particles and ceramic sol particles (with the exception of $TiO_2$ sol particles), the ceramic particles and the ceramic sol particles are kneaded to obtain a kneaded product or a slurry, the kneaded product or the slurry being sintered at a lower temperature, wherein the ceramic sol particles have an average particle diameter of 1/5 or less of an average particle diameter of the ceramic particles, and the ceramic sol has a solid content of 1 to 30% by weight based on the weight of solid content of the ceramic particles.

The ceramic porous membrane of the present invention can use, as the ceramic sol particles, ceramic sol particles other than $ZrO_2$, ceramic sol particles other than $SiO_2$, or ceramic sol particles other than a mixture of $ZrO_2$ sol particles and $SiO_2$ sol particles.

The ceramic sol particles preferably contain at least one of $Al_2O_3.SiO_2$, and $MgO.Al_2O_3$.

Further, according to the present invention, there is provided a ceramic porous body, wherein the ceramic porous membrane is formed on the surface of a porous substrate.

According to another aspect of the present invention, there is provided a method of manufacturing a ceramic porous membrane, which comprises adding ceramic sol particles (with the exception of $TiO_2$ sol particles) having an average particle diameter of 1/5 or less of an average particle diameter of ceramic particles to the ceramic particles such that the solid content of the ceramic sol is 1 to 30% by weight based on the weight of a solid content of the ceramic particles, mixing the particles, depositing or molding the resulting mixture, and heat treating the resulting film or molded product at 300° C. or less under aqueous vapor atmosphere, thereby fixing the ceramic particles.

According to further another aspect of the present invention, there is provided a method of manufacturing a ceramic porous membrane, which comprises adding ceramic sol particles (with the exception of $TiO_2$ sol particles) having an average particle diameter of 1/5 or less of an average particle diameter of ceramic particles to the ceramic particles such that the solid content of the ceramic sol is 1 to 30% by weight based on the weight of a solid content of the ceramic particles, mixing the particles, depositing or molding the resulting mixture, and heat treating the resulting film or molded product at 300 to 700° C. under air (ambient) atmosphere, thereby fixing the ceramic particles.

In the above manufacturing method of the present invention, the ceramic sol particles preferably contain at least one of $SiO_2$, $ZrO_2$, $Al_2O_3.SiO_2$, and $MgO.Al_2O_3$.

PREFERRED EMBODIMENTS OF THE INVENTION

The ceramic porous body of the present invention comprises a porous substrate comprising a porous ceramic having relatively large pore diameter, and a ceramic porous membrane having relatively small pore diameter, formed on the surface of the substrate. The ceramic porous body is produced by depositing a slurry prepared by mixing ceramic particles and ceramic sol particles, on the surface of the porous substrate, and sintering the resulting membrane-formed substrate at a low temperature.

The term "low temperature sintering" used herein means a method of treating a slurry or a kneaded product at a temperature of 300° C. or less under aqueous vapor atmosphere, thereby fixing ceramic particles. The ceramic porous membrane produced by this low temperature sintering has a strength sufficiently durable to practical use.

The production of ceramic porous membrane as described above decreases energy consumption, and makes it possible to easily form a ceramic porous membrane having practically usable strength at a temperature at which any specific refractory facilities are not required.

The present invention is described in detail below.

The porous substrate in the present invention is a portion which forms an external form of the ceramic porous body. The function as a filter is mainly performed by a porous membrane formed on the surface of the porous substrate. Therefore, the porous substrate is constituted by porous ceramics having a relatively large pore diameter of about 1 to 30 $\mu$m.

Materials for the porous substrate are not particularly limited, and $Al_2O_3$, $TiO_2$, $Al_2O_3 \cdot SiO_2$, $ZrO_2$, and the like can suitably be used.

The porous substrate is not limited to a single material, and the porous substrate may comprise a ceramic substrate and a ceramic layer covered on the surface thereof.

The porous membrane in the present invention means a membrane comprising a ceramic porous material, which is formed on the porous substrate for the purpose of improving filtration performance of the filter. Ceramic particles and ceramic sol particles are used as raw material to prepare the porous membrane.

The ceramic particles used in the present invention are the main structural element of the porous membrane, and function as a filter. Therefore, ceramic particles having a relatively small average particle diameter of about 0.1 to 1 $\mu$m are used to prepare the porous membrane.

Materials for the ceramic particles, which can be used include $SiO_2$, $TiO_2$, $ZrO_2$, $Al_2O_3 \cdot SiO_2$, $MgO \cdot Al_2O_3$, and mixtures thereof.

On the other hand, the ceramic sol particles have function as a binder for the ceramic particles which are the main structural element of the porous membrane. If the ceramic sol particles have an average particle diameter of less than 5 nm, the ceramic sol particles aggregate. If the ceramic sol particles have an average particle diameter of more than 100 nm, the binding force of the particles themselves is weak, and the ceramic sol particles cannot strongly bind the ceramic particles. Therefore, the ceramic sol particles preferably have an average particle diameter of 5 to 100 nm.

The average particle diameter ratio of the ceramic particles to the ceramic sol particles is preferably 1/5 or less, and more preferably 1/10 or less of the average particle diameter of ceramics used, in order to increase strength of, for example, the membrane formed.

Materials for the ceramic sol particles, which can be used in the present invention, include $ZrO_2$, $SiO_2$, $Al_2O_3 \cdot SiO_2$, $MgO \cdot Al_2O_3$, and the mixtures thereof.

If the amount of the ceramic sol particles added is less than 1% by weight based on the weight of the solid content of the ceramic particles, it is impossible to strongly bind the ceramic particles. On the other hand, if the amount thereof exceeds 30% by weight based on the weight of the solid content of the ceramic particles, pores formed by the ceramic particles are buried with the ceramic sol, and the amount of water permeation decreases. Therefore, the amount of the ceramic sol particles added is preferably 1 to 30% by weight based on the weight of the solid content of the ceramic particles.

A sol liquid having a particle solid content of 5 to 40% by weight is commercially available, and the sol liquid can be used in the present invention.

Ceramic finely-powdered particles having an average particle diameter equal to that of the ceramic sol particles can also be used as well as the ceramic sol particles, so long as those have above-described properties required in the ceramic sol particles.

A method of manufacturing the ceramic porous membrane according to the present invention is described below.
(Manufacturing method 1)

The ceramic porous membrane of the present invention is produced by forming a membrane of a slurry prepared by mixing the ceramic particles and the ceramic sol particles, on the surface of the porous substrate, and heat treating the membrane formed porous substrate at 300° C. or less under aqueous vapor atmosphere.

The ceramic particles and the ceramic sol particles are dispersed in water followed by mixing, to prepare a slurry for membrane formation.

Concentration of the slurry is generally 50% by weight or less, although varying depending on the thickness of the membrane formed. If the slurry concentration exceeds more than 50% by weight, aggregation of ceramic particles occurs, and cracks tend to occur on the membrane.

The slurry may contain an organic binder, such as polyvinyl alcohol (PVA), in order to improve the film formability, and also may contain pH regulator, surface active agent, and the like, in order to improve dispersibility of the particles.

A membrane of the slurry is formed on the surface of the porous substrate comprising porous ceramics to produce a membrane body.

A method for forming a membrane is not particularly limited, and there is, for example, a method of directly coating the slurry on the surface of the porous substrate, thereby forming a membrane.

The method not only forms a membrane on the surface of the porous substrate, but also can be applied to the production of the porous substrate itself. If the same heat treatment is applied to a molded product having the above-described average particle diameter and solid content concentration, a porous substrate having practically usable strength can be produced.

In the present invention, the membrane body is not sintered at a high temperature as in the conventional manner, but is heat-treated at a low temperature of 300° C. or less under aqueous vapor atmosphere, thereby forming a ceramic porous membrane.

The heat treatment according to the present invention makes it possible to form a ceramic porous body having a practically usable strength at a temperature at which refractory facilities are not required.

Figure 1:
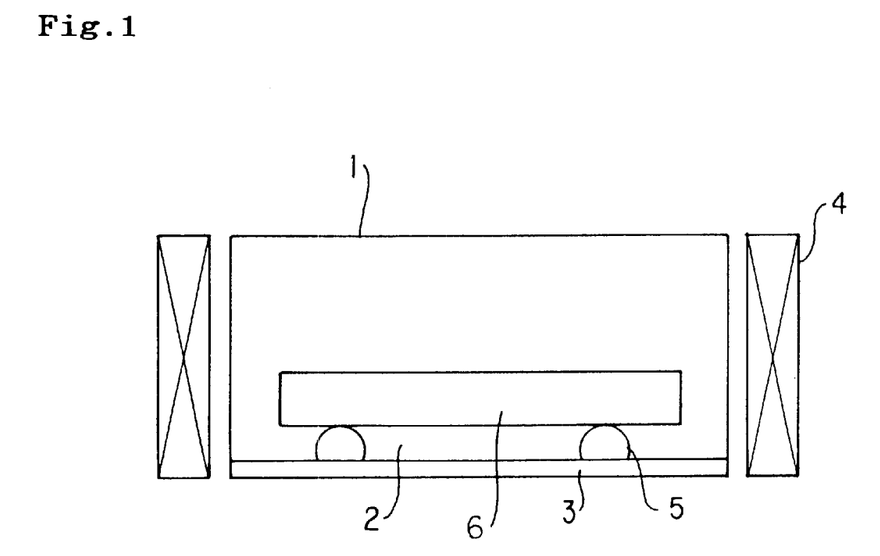
FIG. 1 is a schematic cross sectional view showing one embodiment of the process for heat treating under aqueous vapor atmosphere.

An example of the heat treatment under aqueous vapor atmosphere according to the present invention is a method wherein water 3 is introduced into a closed vessel 1, such as an autoclave furnace, in a volume more than that of the closed vessel based on vapor, and the vessel is heated with a heater 4 from the outside, as shown in FIG. 1.

By employing the above manner, the inside of the closed vessel 1 is aqueous vapor atmosphere, and saturated vapor pressure is applied.

In this method, if water 3 is introduced into the closed vessel in an amount to an extent such that the membrane body 6 is immersed in water, there is the possibility that the slurry formed on the surface of the porous substrate would dissolve.

If the heat treatment temperature is lower than 100° C., a membrane having a sufficient strength is not obtained, and if the temperature is higher than 300° C., $Al_2O_3$ particles dissolve too much, so that the desired pores cannot be formed. Therefore, the preferable heat treatment temperature is 100 to 300° C.

(Manufacturing method 2)

The ceramic porous membrane of the present invention can also be produced by forming a membrane of the same slurry as in the manufacturing method 1, on the surface of the porous substrate, and heat-treating at 300 to 700° C. under ambient (air) atmosphere.

Similar to the manufacturing method 1, the manufacturing method 2 makes it possible to produce a porous membrane having a practically usable strength at a temperature at which refractory facilities are not required.

Further, as being different from the treatment under aqueous vapor atmosphere as in the manufacturing method 1, the manufacturing method 2 has the advantages that it is not necessary to employ a batch-wise heat treatment, and a tunnel-type furnace which is suitable for mass production can be used.

In the manufacturing method 2, the slurry prepared in the same manner as in the manufacturing method 1 is heat-treated under air atmosphere, but the heat treatment is conducted at a temperature of 300 to 700° C.

If the heat treatment temperature is lower than 300° C., strong bond is not formed between the ceramic particles, and if the temperature is higher than 700° C., the bond between the ceramic particles is much stronger, but refractory facilities are required, and in addition to this, a large amount of energy is required, resulting in higher production cost.

Heat treatment conditions other than the temperature are not particularly limited, but it is preferable to conduct heat treatment using a tunnel-type furnace which is suitable for mass production as described above.

The present invention is described in more detail by the following examples wherein a porous body is produced by forming a porous membrane on the surface of the porous substrate, but it should be understood that the present invention is not limited thereto.

Raw materials used are shown below, and evaluation was made under the following conditions.

1) Porous substrate

A slurry composed of alumina particles was deposited on an inner surface of a tubular porous material having an outer diameter of 10 mm, an inner diameter of 7 mm, a length of 100 mm and a pore diameter (according to mercury injection method) of 10 $\mu$m, at a film thickness of 100 $\mu$m. The membrane thus formed had a pore diameter (air flow method as defined in ASTM F306; hereafter referred to as "air flow method") of 0.5 $\mu$m. This product was used as a substrate.

2) Ceramic particles, ceramic sol particles, or finely-powdered particles

Particle diameters of ceramic particles and a finely-powdered ceramic particles were measured by a laser diffraction method, and a particle diameter of the ceramic sol particles was measured with a transmittable electronic microscope, in which an average value between a maximum diameter and a minimum diameter in each sol is regarded as a particle diameter of the particles, and an average value of particle diameters in 100 pieces of sol particles is determined and regarded as a particle diameter of the sol particles.

3) Membrane body

Water was added to ceramic particles and sol particles or finely-powdered particles, followed by mixing. The concentration was adjusted such that the film thickness was about 20 $\mu$m in all the examples and reference examples, and a membrane was formed on the surface at the alumina film side of the substrate 1). The resulting product was dried and used as a membrane body.

4) Evaluation

A pore diameter distribution and water permeation amount by a pure water were measured with respect to the filter of the examples of the present invention. The pore diameter distribution and water permeability are shown as an average pore diameter based on the Air flow method, and an amount of water permeated per a filtration area and 1 hour at pressure difference of 1 kg/cm$^2$ through a membrane and the temperature of 25° C., respectively.

Pore diameter distribution and pure water permeation amount were measured on filters obtained in the examples.

To evaluate membrane strength and adhesion between membrane and substrate, operation that water pressure of 10 Kgf/cm$^2$ was applied from the substrate side, and water was permeated to the membrane side was repeated 100 times, and pore diameter distribution and water permeation amount were measured. Qualitative evaluation was conducted such that where change of 20% or more as compared with values before test was observed, or breakage of membrane was confirmed, the filter was rejectable.

In Examples 1 to 4 and Comparative Examples 1 to 3, a slurry prepared by mixing ceramic particles and ceramic sol particles was deposited on the surface of a porous substrate composed of $Al_2O_3$ according to the manufacturing method 1, and heat treatment was then conducted under aqueous vapor atmosphere.

EXAMPLE 1

$SiO_2$ sol liquid having an average particle diameter of 10 nm was added to $Al_2O_3$ particles having an average particle diameter of 0.7 μm in an amount of 10% by weight, in terms of particle solid content, based on the weight of the $Al_2O_3$ particles, and those were mixed. Water was added to the resulting mixture to prepare a slurry. The slurry was deposited on the surface of the porous substrate.

The resulting membrane body was heat-treated in a closed vessel, such as an autoclave furnace as shown in FIG. 1, at a temperature of 150° C. under water vapor pressure of 5 atm for 10 hours, thereby preparing a ceramic porous body.

Figure 2:
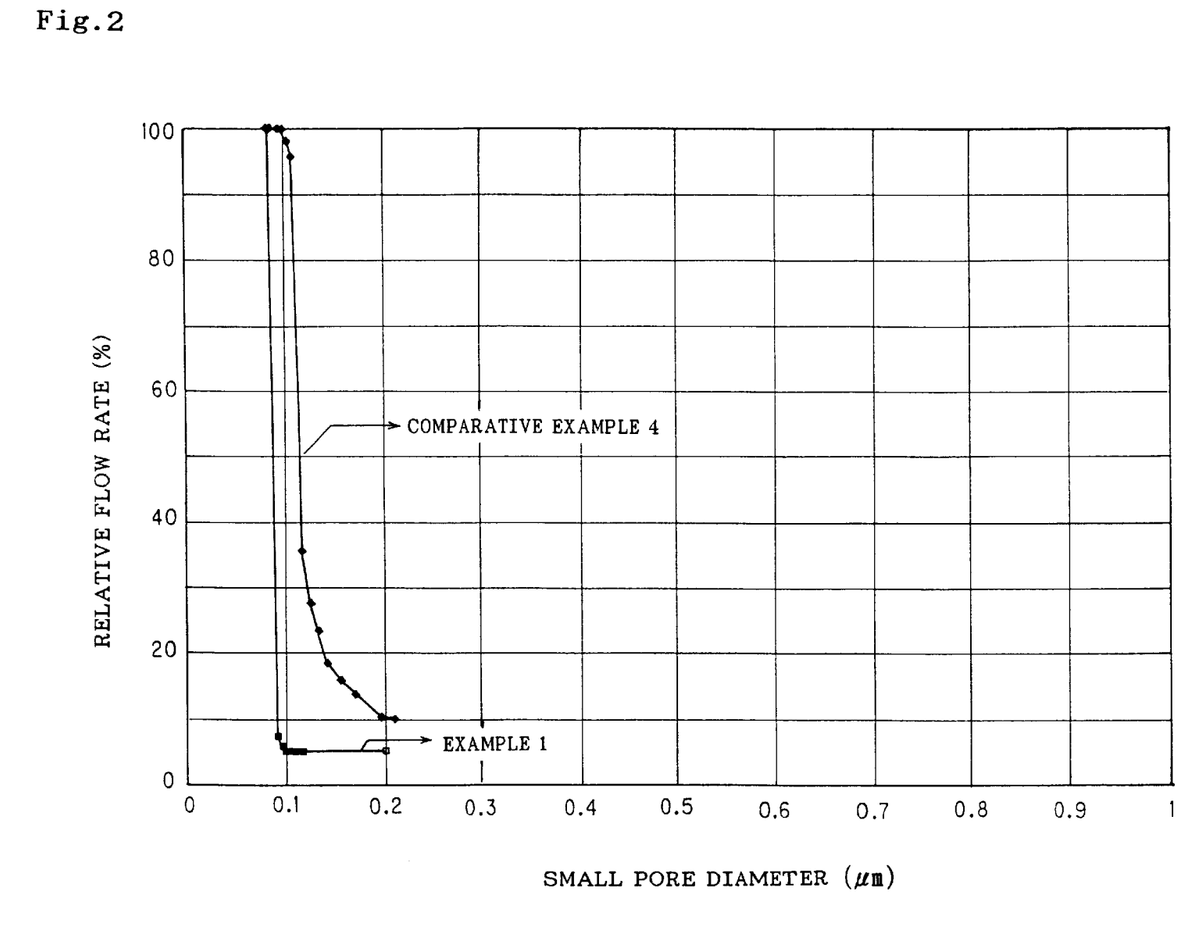
FIG. 2 is a graph showing pore diameter distribution in ceramic porous membranes obtained in Example 4 and Comparative Example 4.
Figure 3A:
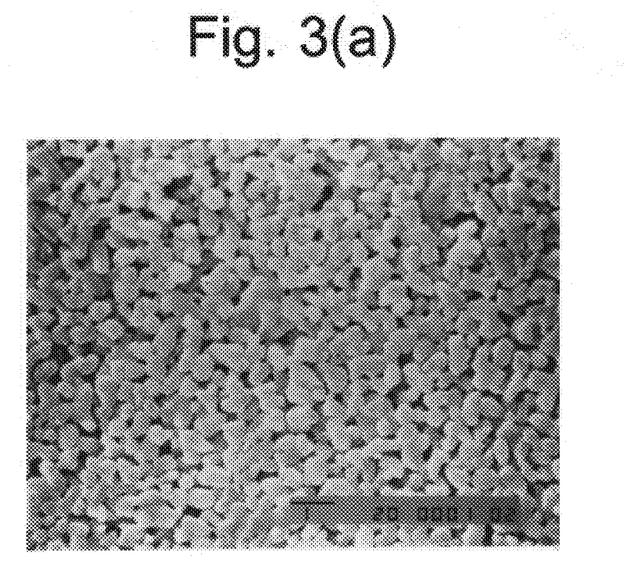
FIG. 3(a) is a photograph showing a particle structure of a membrane surface in the ceramic porous membrane obtained in Example 1.

The pore diameter distribution of the ceramic porous body obtained, is shown in FIG. 2, and the microstructure of the membrane surface thereof is shown in photograph of FIG. 3.

EXAMPLE 2

$SiO_2$ sol liquid having an average particle diameter of 5 nm was added to $ZrO_2$ particles having an average particle diameter of 1.0 μm in an amount of 10% by weight, in terms of the solid content, based on the weight of the $ZrO_2$ particles, and those were mixed. Water was added to the resulting mixture to prepare a slurry, and the slurry was deposited on the surface of the porous substrate.

Heat treatment was conducted in the same manner as in Example 1 at a temperature of 200° C. under water vapor pressure of 15 atm for 7 hours, thereby preparing a ceramic porous body.

EXAMPLE 3

Mullite ($A_2O_3.SiO_2$) sol liquid having an average particle diameter of 50 nm was added to $SiO_2$ particles having an average particle diameter of 1.0 μm in an amount of 5% by weight, in terms of the solid content, based on the weight of the $SiO_2$ particles, and those were mixed. Water was added to the resulting mixture to prepare a slurry, and the slurry was deposited on the surface of the porous substrate.

Heat treatment was conducted in the same manner as in Example 1 at a temperature of 180° C. under water vapor pressure of 10 atm for 5 hours, thereby preparing a ceramic porous body.

EXAMPLE 4

Spinel ($MgO.Al_2O_3$) sol liquid having an average particle diameter of 50 nm was added to mullite ($Al_2O_3.SiO_2$) particles having an average particle diameter of 0.5 μm in an amount of 5% by weight, in terms of the solid content, based on the weight of the mullite particles, and those were mixed. Water was added to the resulting mixture to prepare a slurry, and the slurry was deposited on the surface of the porous substrate.

Heat treatment was conducted in the same manner as in Example 1 at a temperature of 150° C. under water vapor pressure of 5 atm for 10 hours, thereby preparing a ceramic porous body.

COMPARATIVE EXAMPLE 1

$SiO_2$ sol liquid having an average particle diameter of 150 nm was added to $Al_2O_3$ particles having an average particle diameter of 0.7 μm in an amount of 10% by weight, in terms of particle solid content, based on the weight of the $Al_2O_3$ particles, and those were mixed. Water was added to the resulting mixture to prepare a slurry. The slurry was deposited on the surface of the porous substrate.

Heat treatment was conducted in the same manner as in Example 1 at a temperature of 150° C. under water vapor pressure of 5 atm for 10 hours, thereby preparing a ceramic porous body.

COMPARATIVE EXAMPLE 2

$SiO_2$ sol liquid having an average particle diameter of 10 nm was added to $Al_2O_3$ particles having an average particle diameter of 0.7 μm in an amount of 0.5% by weight, in terms of particle solid content, based on the weight of the $Al_2O_3$ particles, and those were mixed. Water was added to the resulting mixture to prepare a slurry. The slurry was deposited on the surface of the porous substrate.

Heat treatment was conducted in the same manner as in Example 1 at a temperature of 150° C. under water vapor pressure of 5 atm for 10 hours, thereby preparing a ceramic porous body.

COMPARATIVE EXAMPLE 3

$SiO_2$ sol liquid having an average particle diameter of 10 nm was added to $Al_2O_3$ particles having an average particle diameter of 0.7 μm in an amount of 35% by weight, in terms of particle solid content, based on the weight of the $Al_2O_3$ particles, and those were mixed. Water was added to the resulting mixture to prepare a slurry. The slurry was deposited on the surface of the porous substrate.

Heat treatment was conducted in the same manner as in Example 1 at a temperature of 150° C. under water vapor pressure of 5 atm for 10 hours, thereby preparing a ceramic porous body.

COMPARATIVE EXAMPLE 4

A slurry was prepared using $Al_2O_3$ particles having an average particle diameter of 0.7 μm without adding ceramic sol, and the slurry was deposited on the surface of the porous substrate.

The resulting membrane body could not form a porous membrane under the heat treatment conditions of Example 1. Therefore, the membrane body was sintered at 1,350° C. for 1 hour under ambient atmosphere to obtain a ceramic porous body.

Figure 3B:
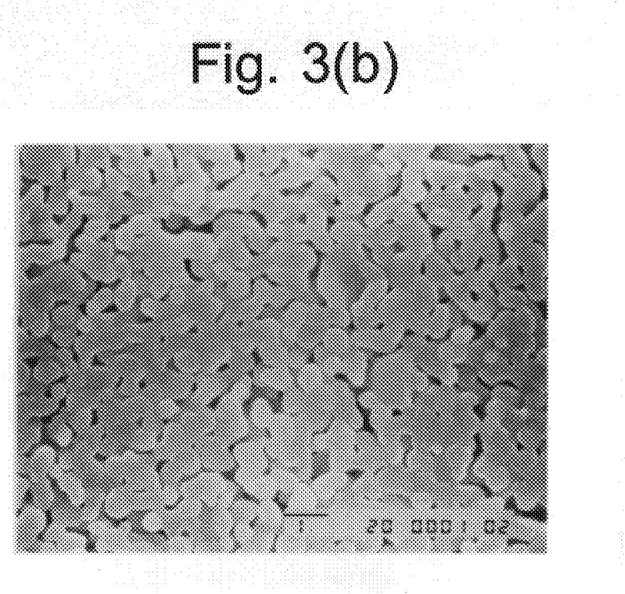
FIG. 3(b) is a photograph showing a particle structure of a membrane surface in the ceramic porous membrane obtained in Comparative Example 4.

Pore diameter distribution of the ceramic porous body obtained is shown in FIG. 2, and microstructure of the membrane surface thereof is shown in FIG. 3.

Ceramic porous bodies after heat treatment were evaluated. The results obtained are shown in Tables 1 and 2 below.

TABLE 1

Details of raw materials of porous membrane

| | Ceramic particles | | Ceramic sol particles | | | Heat treatment condition | | |
|---|---|---|---|---|---|---|---|---|
| | Kind | Particle diameter ($\mu$m) | Kind | Particle diameter ($\mu$m) | Amount added (wt %) | Temperature (° C.) | Vapor pressure (atm) | Time (hr) |
| Example | | | | | | | | |
| 1 | A | 0.7 | S | 10 | 10 | 150 | 5 | 10 |
| 2 | Z | 1.0 | S | 5 | 10 | 200 | 15 | 7 |
| 3 | S | 1.0 | M | 50 | 5 | 180 | 10 | 5 |
| 4 | M | 0.5 | SP | 50 | 5 | 150 | 5 | 10 |
| Comparative Example | | | | | | | | |
| 1 | A | 0.7 | S | 150 | 10 | 150 | 5 | 10 |
| 2 | A | 0.7 | S | 10 | 0.5 | 150 | 5 | 10 |
| 3 | A | 0.7 | S | 10 | 35 | 150 | 5 | 10 |
| 4 | A | 0.7 | — | — | — | 1,350 | — | 1 |

NOTE:
A: Alumina
Z: Zirconia
M: Mullite
S: Silica
SP: Spinel

TABLE 2

| | Quality of porous body | | |
|---|---|---|---|
| | Pore diameter ($\mu$m) | Water permeation amount (m$^3$/m$^2$h) | Membrane strength test |
| Example | | | |
| 1 | 0.1 | 1.8 | ○ |
| 2 | 0.2 | 3.6 | ○ |
| 3 | 0.2 | 3.8 | ○ |
| 4 | 0.1 | 1.5 | ○ |
| Comparative Example | | | |
| 1 | 0.1 | 1.9 | x |
| 2 | 0.1 | 2.0 | x |
| 3 | 0.1 | 0.9 | ○ |
| 4 | 0.1 | 2.0 | ○ |

Notes
○: Membrane strength test passed
x: Membrane strength test rejected

Where a slurry that has an average particle diameter of ceramic sot particles is ⅕ or less of ceramic particles, and solid content of ceramic sot is 1 to 30% by weight based on the weight of solid content of ceramics, is deposited on a porous substrate, and a predetermined heat treatment is applied, as shown in Examples 1 to 4, there is no problem on membrane strength of porous membrane formed on the surface of porous substrate, and the membrane is sufficiently durable to practical uses.

On the other hand, where an average particle diameter of ceramic sol particles is larger than ⅕ of ceramic particles, membrane strength of porous membrane formed on the surface of porous substrate is decreased as shown in Comparative Example 1.

Further, where the amount of the ceramic sol particles added is less than 1% by weight, the ceramic particles cannot strongly be bound. Therefore, the membrane strength formed on the surface of the porous substrate decreases as shown in Comparative Example 2. On the other hand, where the amount thereof exceeds 30% by weight, pores constituted of the ceramic particles are filled with the ceramic sol, resulting in decrease in water permeation amount as shown in Comparative Example 3.

Where the ceramic sol particles are not added, a porous membrane is not formed under the conditions of 300° C. or less and vapor atmosphere. Therefore, sintering must be conducted at a high temperature as shown in Comparative Example 4.

Examples 5 to 7 show the embodiment in which, according to the manufacturing method 2, heat treatment is conducted under ambient atmosphere using an electric furnace for atmospheric treatment.

A porous substrate used in Examples 5 to 7 was that a slurry composed of alumina particles was deposited on one surface of a flat plate-like porous substrate composed of alumina, having a diameter of 22 mm, a thickness of 3 mm, and a pore diameter (mercury injection method) of 10 $\mu$m, and the resulting membrane had a pore diameter (air flow method) of 0.5 $\mu$m.

Strength of a porous membrane was evaluated by measuring a Vickers hardness, which differed from the manufacturing method 1. A load applied in this measurement was 50 gf.

Further, to evaluate acid resistance and alkali resistance, a sample was dipped in a 2% citric acid aqueous solution and a sodium hypochlorite of 5,000 ppm in terms of effective chlorine, and a Vickers hardness of the sample thus treated was measured.

Content of a part originated from sol particles or finely-powdered particles in a porous membrane was measured such that a cross section of a porous membrane after heat treatment was analyzed with an energy dispersion type X ray analyzer to measure amounts of elements, and the elements were converted to their oxides to calculate the weight ratio to the ceramic particles.

EXAMPLES 5 TO 7, AND COMPARATIVE EXAMPLES 5 TO 6

Using various ceramic particles and ceramic sol particles as shown in Table 3, heat treatment was conducted under the conditions as shown in Table 3 to produce ceramic porous bodies of the present invention. The results obtained are shown in Table 4 below.

Comparative Example 6 was that the sample obtained in Comparative Example 5 was heat treated at 1,350° C. for 2 hours.

TABLE 3

| | Details of raw materials of porous membrane | | | | Heat treatment condition | |
|---|---|---|---|---|---|---|
| | Ceramic particles | | Ceramic sol particles | | Tem- | |
| | Kind | Particle diameter ($\mu$m) | Kind | Particle diameter ($\mu$m) | Amount added (wt %) | perature (° C.) | Time (hr) |
| Example | | | | | | | |
| 5 | A | 0.7 | Z | 70 | 50 | 500 | 4 |
| 6 | A | 0.7 | S | 10 | 30 | 500 | 4 |
| 7 | A | 0.7 | A | 20 | 30 | 500 | 4 |
| Comparative Example | | | | | | | |
| 5 | A | 0.7 | — | — | — | 500 | 4 |
| 6 | A | 0.7 | — | — | — | 1,350 | 2 |

NOTE:
A: Alumina
Z: Zirconia
S: Silica

TABLE 4

| | Finely-powdered particles in membrane (wt %) | Pore diameter ($\mu$m) | Water permeation amount (m$^3$/m$^2$hr) | Vickers hardness | | |
|---|---|---|---|---|---|---|
| | | | | Non-treatment | After acid treatment | After alkali treatment |
| Example | | | | | | |
| 5 | 10 | 0.08 | 1.7 | 910 | 90 | 85 |
| 6 | 3 | 0.07 | 1.7 | 110 | 100 | 15 |
| 7 | 3 | 0.07 | 1.7 | 105 | 20 | 20 |
| Comparative Example | | | | | | |
| 5 | — | — | — | 10 | — | — |
| 6 | — | 0.1 | 2.0 | 80 | 80 | 80 |

As far as the conditions in Examples 5 to 7 shown in Table 3 were employed, a ceramic porous membrane having a practically usable strength could be formed in all the examples.

However, where SiO$_2$ was used as the ceramic sol, alkali resistance was poor, and where Al$_2$O$_3$ sol was used as the ceramic sol, acid resistance and alkali resistance were poor, as shown in Examples 6 and 7.

Contrary to this, Comparative Example 5 in which a ceramic sol was not added could not form a membrane having sufficient strength under the heat treatment condition of 500° C., and unless sintering was conducted at a high temperature of 1,350° C. as in Comparative Example 6, a membrane having sufficient strength could not be formed.

The ceramic porous membrane and the manufacturing method thereof according to the present invention involve heat treatment at 300° C. under aqueous vapor atmosphere, or at 300 to 700° C. under ambient atmosphere. Therefore, a ceramic porous membrane having practically usable strength can be formed at a temperature where fire-resistant facilities are not required.

What is claimed is:

1. A ceramic porous membrane, comprising:
   a layer comprising a mixture of (1) fixed ceramic particles having an average particle diameter of about 0.1 to 1 $\mu$m and (2) as binder therefor ceramic sol particles other than TiO$_2$ sol particles, wherein the ceramic sol particles have an average particle diameter of ⅕ or less of an average particle diameter of the ceramic particles, and the ceramic sol comprises a solid content of 1 to 30% by weight based on the weight of a solid content of the ceramic particles.

2. A ceramic porous membrane as claimed in claim 1, wherein the ceramic sol particles comprise ceramic sol particles other than ZrO$_2$.

3. A ceramic porous membrane as claimed in claim 2, wherein the ceramic sol particles comprise ceramic sol particles other than SiO$_2$.

4. A ceramic porous membrane as claimed in claim 1, wherein the ceramic sol particles comprise ceramic sol particles other than SiO$_2$.

5. A ceramic porous membrane as claimed in claim 1, wherein the ceramic sol particles comprise ceramic sol particles other than a mixture of ZrO$_2$ sol particles and SiO$_2$ sol particles.

6. A ceramic porous membrane as claimed in claim 1, wherein the ceramic sol particles comprise at least one of Al$_2$O$_3$.SiO$_2$, and MgO.Al$_2$O$_3$.

7. A ceramic porous body, comprising:
   a porous substrate and a ceramic porous membrane deposited on the surface of the porous substrate,
   the ceramic porous membrane comprising a layer comprising a mixture of (1) fixed ceramic particles having an average particle diameter of about 0.1 to 1 $\mu$m and (2) as binder therefor ceramic sol particles other TiO$_2$ sol particles, wherein the ceramic sol particles have an average particle diameter of ⅕ or less of an average particle diameter of the ceramic particles, and the ceramic sol comprises a solid content of 1 to 30% by weight based on the weight of a solid content of the ceramic particles.

8. A method of manufacturing a ceramic porous membrane, comprising the steps of:

adding to ceramic particles, ceramic sol particles other than $TiO_2$ sol particles, having an average particle diameter of ⅕ or less of an average particle diameter of the ceramic particles so that the solid content of the ceramic sol comprises 1 to 30% by weight based on the weight of a solid content of the ceramic particles, mixing the ceramic and ceramic sol particles, depositing or molding the resulting mixture, and heat treating the resulting film or molded product at a temperature of 300° C. or less in an aqueous vapor atmosphere for thereby fixing the ceramic particles.

9. A method as claimed in claim 8, wherein the ceramic sol particles comprise at least one of $SiO_2$, $ZrO_2$, $Al_2O_3 \cdot SiO_2$, and $MgO \cdot Al_2O_3$.

10. A method as claimed in claim 8, wherein the ceramic particles have an average particle diameter of about 0.1 to 1 μm.

11. A method of manufacturing a ceramic porous membrane, comprising the steps of:

adding to ceramic particles, ceramic sol particles other than $TiO_2$ sol particles, having an average particle diameter of ⅕ or less of an average particle diameter of the ceramic particles such that the solid content of the ceramic sol comprises 1 to 30% by weight based on the weight of a solid content of the ceramic particles, mixing the ceramic and ceramic sol particles, depositing or molding the resulting mixture, and heat treating the resulting film or molded product at a temperature of 300 to 700° C. in an ambient atmosphere for thereby fixing the ceramic particles.

12. A method as claimed in claim 11, wherein the ceramic sol particles comprise at least one of $SiO_2$, $ZrO_2$, $Al_2O_3 \cdot SiO_2$, and $MgO \cdot Al_2O_3$.

13. A method as claimed in claim 11, wherein the ceramic particles have an average particle diameter of about 0.1 to 1 μm.

* * * * *